US012755046B2

(12) United States Patent
Lin

(10) Patent No.: US 12,755,046 B2
(45) Date of Patent: Oct. 6, 2026

(54) DATA PROTECTION METHOD, DATA PROTECTION DEVICE AND MICRO-CONTROLLER

(71) Applicant: Nuvoton Technology Corporation, Hsinchu Science Park (TW)

(72) Inventor: Wei-Cheng Lin, Kaohsiung City (TW)

(73) Assignee: NUVOTON TECHNOLOGY CORPORATION, Hsinchu Sciencepark (TW)

( * ) Notice: Subject to any disclaimer, the term of this patent is extended or adjusted under 35 U.S.C. 154(b) by 215 days.

(21) Appl. No.: 18/091,652

(22) Filed: Dec. 30, 2022

(65) Prior Publication Data

US 2023/0214519 A1 Jul. 6, 2023

(30) Foreign Application Priority Data

Dec. 30, 2021 (TW) ................................ 110149560

(51) Int. Cl.
*G06F 21/62* (2013.01)
*G06F 21/60* (2013.01)

(52) U.S. Cl.
CPC ........ *G06F 21/6227* (2013.01); *G06F 21/602* (2013.01)

(58) Field of Classification Search
CPC ..... G06F 21/602; G06F 21/6227; G06F 21/62
See application file for complete search history.

(56) References Cited

U.S. PATENT DOCUMENTS 7,350,085 B2 * 3/2008 Johnson .............. G06F 12/1408 711/216
2002/0090986 A1 * 7/2002 Cote .................. G07F 17/3248 463/16

(Continued)

FOREIGN PATENT DOCUMENTS

CN 1302013 A 7/2001
CN 101241758 A 8/2008

(Continued)

OTHER PUBLICATIONS

Taiwanese Office Action dated May 30, 2023, for the corresponding application No. 110149560; pp. 1-13.

(Continued)

*Primary Examiner* — Dao Q Ho
(74) *Attorney, Agent, or Firm* — Muncy, Geissler, Olds & Lowe, P.C.

(57) ABSTRACT

A data protection method includes the following steps. Input data is split into a plurality of data groups. The original start-address of each data group and the data length of each data group are recorded. The data groups are reordered randomly. The reordered data groups constitute random data. The new start-address of each reordered data group is recorded. The original start-addresses, the data lengths, and the new start-addresses are collected to form a look-up table. The look-up table records the original start-addresses of the data groups and the new start-addresses of the reordered data groups. Each original start-address corresponds to one new start-address. The random data is stored in the storage memory. The look-up table is stored in the memory controller.

18 Claims, 8 Drawing Sheets

(56) References Cited

U.S. PATENT DOCUMENTS

| | | | | |
|---|---|---|---|---|
| 2002/0133774 | A1* | 9/2002 | Inoue | G01R 31/31935 714/736 |
| 2005/0083298 | A1* | 4/2005 | Loh | G06F 3/04166 345/156 |
| 2008/0218387 | A1* | 9/2008 | Chang | H03M 7/425 341/67 |
| 2012/0166582 | A1* | 6/2012 | Binder | G06F 7/58 709/217 |
| 2014/0185690 | A1* | 7/2014 | Wang | H04N 21/8451 375/240.01 |
| 2017/0046223 | A1* | 2/2017 | Kern | G11C 29/52 |
| 2020/0004975 | A1* | 1/2020 | Reed | G06F 9/542 |
| 2020/0293202 | A1* | 9/2020 | Chien | G06F 3/0655 |
| 2020/0357446 | A1* | 11/2020 | Haywood | G06F 11/073 |
| 2021/0303425 | A1* | 9/2021 | Pozidis | H03M 13/154 |
| 2022/0171887 | A1* | 6/2022 | Chritz | H04L 9/3242 |
| 2022/0229592 | A1* | 7/2022 | Li | G06F 3/0659 |
| 2023/0214519 | A1* | 7/2023 | Lin | G06F 21/79 713/193 |

FOREIGN PATENT DOCUMENTS

| | | | | |
|---|---|---|---|---|
| CN | 107292192 | A | * 10/2017 | H04L 9/00 |
| TW | 202036319 | A | 1/2020 | |
| TW | 1750013 | B | 12/2021 | |

OTHER PUBLICATIONS

Office Action of TW Application No. 110149560 dated Jan. 16, 2023, 10 pages.

* cited by examiner

220

| | Original start-address | Data length (byte) | New start-address |
|---|---|---|---|
| 211 | 0x1800 | 4 | 0x1814 |
| 212 | 0x1804 | 4 | 0x1808 |
| 213 | 0x1808 | 8 | 0x1818 |
| 214 | 0x1810 | 8 | 0x1800 |
| 215 | 0x1818 | 4 | 0x180C |
| 216 | 0x181C | 4 | 0x1810 |

FIG. 2C

DATA PROTECTION METHOD, DATA PROTECTION DEVICE AND MICRO-CONTROLLER

CROSS REFERENCE TO RELATED APPLICATIONS

This application claims priority of Taiwan Patent Application No. 110149560, filed on Dec. 30, 2021, the entirety of which is incorporated by reference herein.

BACKGROUND OF THE INVENTION

Field of the Invention

The invention relates to a data protection method, and more particularly to a data protection method for avoiding data theft.

Description of the Related Art

In conventional microcontrollers, there is usually an internal storage memory. The internal storage memory stores code and data in machine code in clear-text. However, the code and data in the internal storage memory are vulnerable to theft.

BRIEF SUMMARY OF THE INVENTION

An exemplary embodiment of a data protection method is described in the following paragraph. Input data is split into a plurality of data groups. The original start-address of each data group and the data length of each data group are recorded. The data groups are randomly reordered. The reordered data groups constitute random data. The new start-address of each reordered data group is recorded. The original start-addresses, the data lengths, and the new start-addresses are collected to form a look-up table. The look-up table records the original start-addresses of the data groups and the new start-addresses of the reordered data groups, and each original start-address corresponds to one new start-address. The random data is stored into a storage memory. The look-up table is stored into a memory controller.

In accordance with another embodiment of the disclosure, a data protection device comprises a reordering circuit, a storage memory, and a memory controller. The reordering circuit splits input data into a plurality of data groups and records the original start-address of each data group and the data length of each data group. The reordering circuit randomly reorders the data groups. The reordered data groups constitute random data. The reordering circuit records the new start-address of each reordered data group, and collects the original start-addresses, the data lengths, and the new start-addresses to generate a look-up table. The look-up table records the original start-addresses of the data groups and the new start-addresses of the reordered data groups. Each original start-address corresponds to one new start-address. The storage memory stores the random data. The memory controller stores the look-up table.

In accordance with a further embodiment of the disclosure, a micro-controller unit comprises a storage memory and a memory controller. The storage memory stores random data which comprises a plurality of data groups. The memory controller stores a look-up table which records a plurality of original addresses, data lengths of the data groups and a plurality of random addresses which are the addresses of the data groups in the storage memory. The memory controller selects one specific random address of the random addresses recorded in the look-up table according to a read address and reads the storage memory according to the specific random address to determine a specific data group of the data groups. The specific random address corresponds to a specific address among the original addresses, and the specific address is the same as the read address.

Data protection methods may be practiced by systems which have hardware or firmware capable of performing particular functions and may take the form of program code embodied in a tangible media. When the program code is loaded into and executed by an electronic device, a processor, a computer or a machine, the electronic device, the processor, the computer or the machine becomes a data protection device for practicing the disclosed method.

BRIEF DESCRIPTION OF THE DRAWINGS

The invention can be more fully understood by referring to the following detailed description and examples with references made to the accompanying drawings, wherein:

FIG. 2C is a schematic diagram of an exemplary embodiment of a look-up table according to various aspects of the present disclosure.

DETAILED DESCRIPTION OF THE INVENTION

Figure 1:
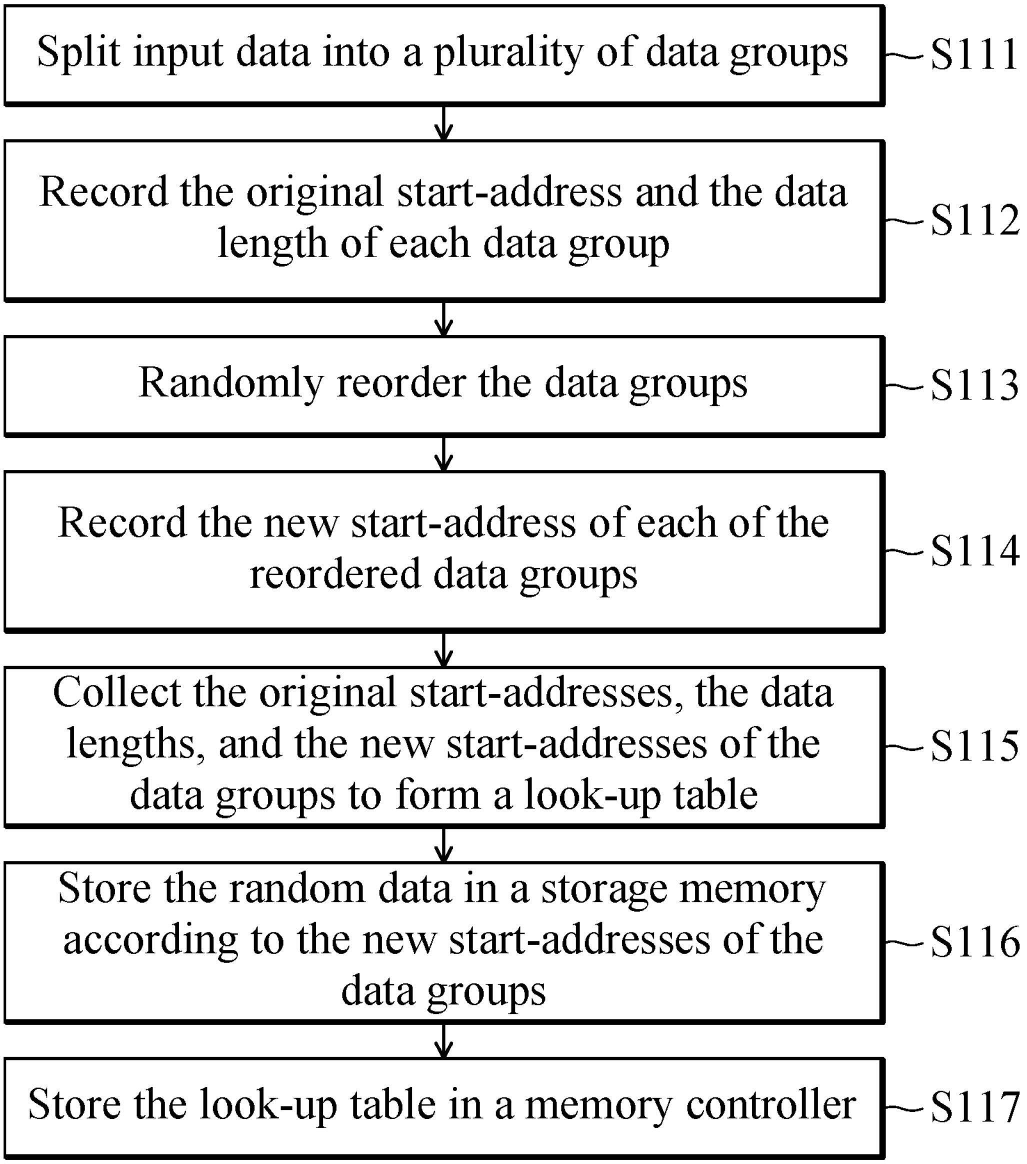
FIG. 1 is a flowchart of an exemplary embodiment of a data protection method according to various aspects of the present disclosure.

The present invention will be described with respect to particular embodiments and with reference to certain drawings, but the invention is not limited thereto and is only limited by the claims. The drawings described are only schematic and are non-limiting. In the drawings, the size of some of the elements may be exaggerated for illustrative purposes and not drawn to scale. The dimensions and the relative dimensions do not correspond to actual dimensions in the practice of the invention.

FIG. 1 is a flowchart of an exemplary embodiment of a data protection method according to various aspects of the present disclosure. The data protection method can be applied in a micro-controller unit (MCU). First, input data is split into a plurality of data groups (step S111). In one embodiment, the addresses of input data are contiguous.

Figure 2A:
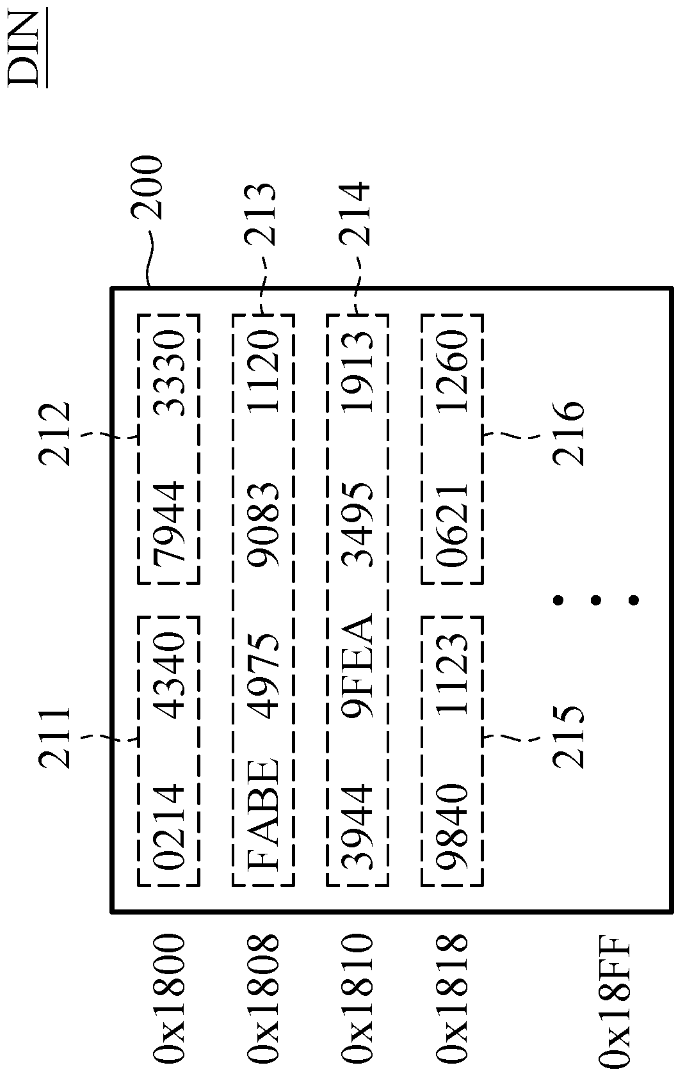
FIG. 2A is a schematic diagram of an exemplary embodiment of a machine code in clear-text according to various aspects of the present disclosure.

FIG. 2A is a schematic diagram of an exemplary embodiment of a machine code clear-text according to various aspects of the present disclosure. Input data DIN may store in a storage memory 200. In this embodiment, the input data DIN is split into data groups 211~216. The data length of each of the data groups 211~216 is not limited in the present disclosure. In one embodiment, the data length of one of the data groups 211~216 is different from the data length of another of the data groups 211~216. For example, the data group 211 has 4 bytes of data and the data group 213 has 8 bytes of data. In some embodiments, the data length of one of the data groups 211~216 is the same as the data length of another of the data groups 211~216. For example, each of the data groups 211 and 212 has 4 bytes of data.

Next, the original start-address and the data length of each data group are recorded (step S112). As illustrated in FIG. 2A, the original start-address (which can also be referred to as the original address) of the data group 211 is 0x1800, the original start-address of the data group 212 is 0x1804, the original start-address of the data group 213 is 0x1808, the original start-address of the data group 214 is 0x1810, the original start-address of the data group 215 is 0x1818, and the original start-address of the data group 216 is 0x181C. Additionally, the data length of each of the data groups 211, 212, 215, and 216 is 4 because each of the data groups 211, 212, 215, and 216 has 4 bytes of data. The data length of each of the data groups 213 and 214 is 8 because each of the data groups 213 and 214 has 8 bytes of data.

Figure 2B:
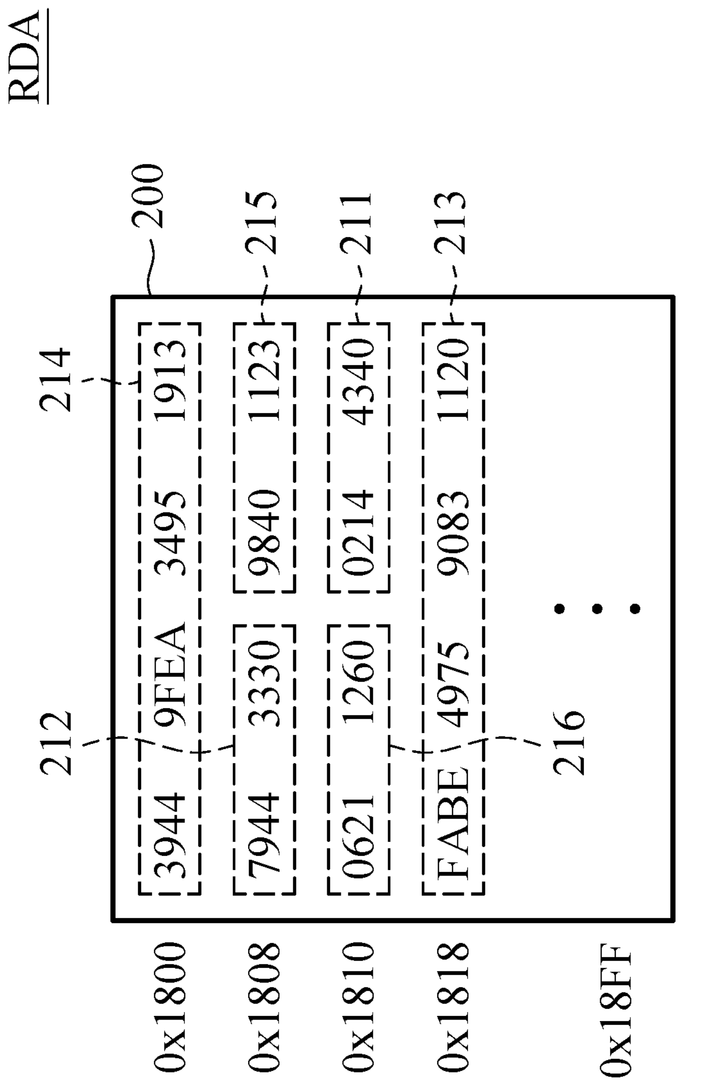
FIG. 2B is a schematic diagram of an exemplary embodiment of random data according to various aspects of the present disclosure.

Then, the data groups 211~216 are randomly reordered to rearrange the data groups 211~216 in a different order (step S113). The reordered data groups constitute random data. FIG. 2B is a schematic diagram of an exemplary embodiment of the random data according to various aspects of the present disclosure. After reordering the data groups 211~216, the sequence of the reordered data groups is the data group 214, the data group 212, the data group 215, the data group 216, the data group 211, and the data group 213. Comparing to FIG. 2, before reordering the data groups 211~216, the sequence of the input data DIN is the data group 211, the data group 212, the data group 213, the data group 214, the data group 215 and the data group 216.

Next, the new start-address of each of the reordered data groups is recorded (step S114). As shown in FIG. 2B, after reordering the data groups 211~216, the new start-address (which can also be referred to as a random address) of the data group 214 is 0x1800, the new start-address of the data group 212 is 0x1808, the new start-address of the data group 215 is 0x180C, the new start-address of the data group 216 is 0x1810, the new start-address of the data group 211 is 0x1814, and the new start-address of the data group 213 is 0x1818. In this case, the reordered data groups are still stored in the storage memory 200.

Next, the original start-addresses, the data lengths, and the new start-addresses of the data groups 211~216 are collects to form a look-up table (step S115). FIG. 2C is a schematic diagram of an exemplary embodiment of the look-up table according to various aspects of the present disclosure. As shown in FIG. 2C, the look-up table 200 records the relationships of the original start-addresses, the data lengths, and the new start-addresses of the data groups 211~216. Taking the data group 211 as an example, the original start-address of the data group 211 is 0x1800 and the data length of the data group 211 is 4. After reordering the data groups 211~216, the new start-address of the data group 211 is 0x1814.

Figure 2D:
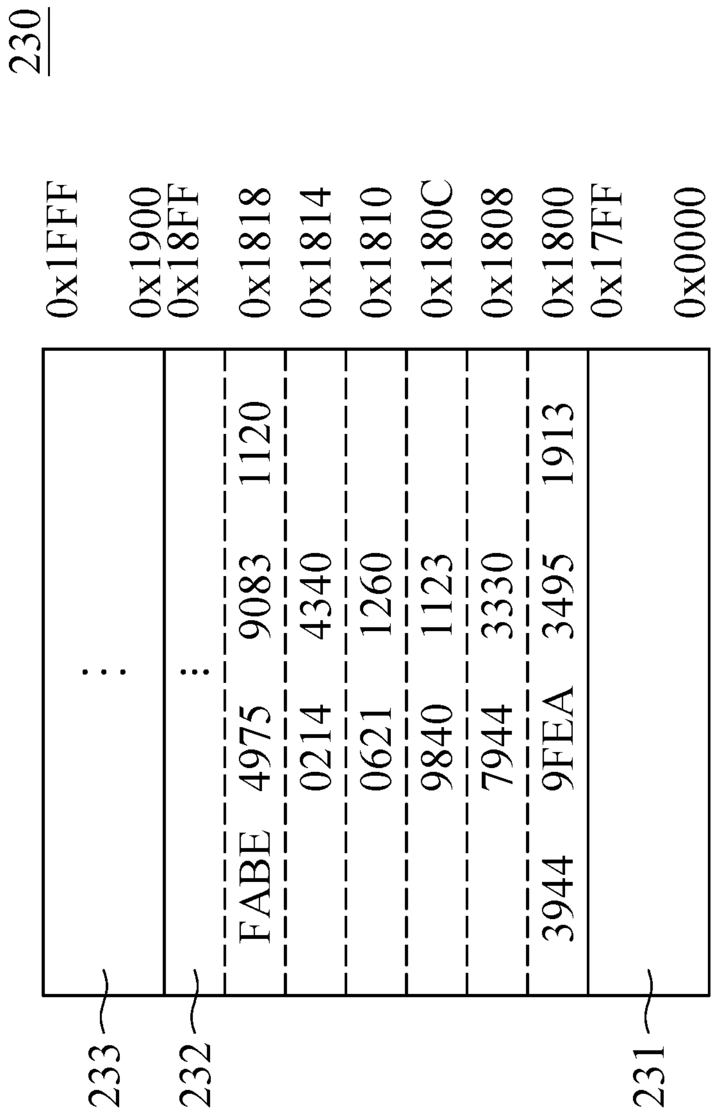
FIG. 2D is a schematic diagram of an exemplary embodiment of a storage memory according to various aspects of the present disclosure.

The random data is stored in a storage memory according to the new start-addresses of the data groups (step S116). FIG. 2D is a schematic diagram of an exemplary embodiment of the storage memory according to various aspects of the present disclosure. As shown in FIG. 2D, the storage memory 230 comprises blocks 231~233. In one embodiment, the storage memory 230 is a flash memory. The number of blocks of the storage memory 230 is not limited in the present disclosure. In other embodiments, the storage memory 230 comprises more blocks or fewer blocks. In this embodiment, the start-address of the block 231 is 0x0000, and the end-address of the block 231 is 0x17FF. The start-address of the block 232 is 0x1800, and the end-address of the block 232 is 0x18FF. The start-address of the block 233 is 0x1900, and the end-address of the block 233 is 0x1FFF.

In some embodiments, the random data is stored in the block 232. As shown in FIG. 2D, the start-address of the data group 214 of the random data is 0x1800, the start-address of the data group 212 of the random data is 0x1808, the start-address of the data group 215 of the random data is 0x180C, the start-address of the data group 216 of the random data is 0x1810, the start-address of the data group 211 of the random data is 0x1814, and the start-address of the data group 213 of the random data is 0x1818.

Then, the look-up table is stored in a memory controller (step S117). In one embodiment, the memory controller writes the random data RDA shown in FIG. 2B to the storage memory 230 according to the look-up table. In this case, when the memory controller receives a read command, the memory controller enters a read mode. In the read mode, the memory controller decodes the read command to generate a read address (e.g., 0x1800). The memory controller checks the look-up table 220 to find a new start-address (e.g., 0x1814) corresponding to the read address. The memory controller reads the storage memory 230 and output a data group (e.g., 211) corresponding to the new start-address (e.g., x1814).

In some embodiments, after generating the look-up table, an encryption operation is performed to encrypt the look-up table. The encrypted look-up table can be referred to as encrypted data. In such cases, the memory controller performs a decryption operation to decrypt the encrypted data. The memory controller stores the decrypted data (i.e., the look-up table). In one embodiment, the decryption operation is performed by a decryption circuit. The decryption circuit may be integrated into the memory controller or disposed outside of the memory controller.

In some embodiments, in step S115, a Binary-tree search method is used to arrange the data groups 211~216 to speed up the memory controller's search for the look-up table. In this case, the arranged result is provided as the look-up table. In other embodiments, in step S115, the data groups 211~216 are arranged according to the data lengths of the data groups 211~216. For example, since the data length of each of the data groups 211, 212, 215, and 216 is lower than the data length of each of the data groups 213 and 214, the data groups 211, 212, 215, and 216 are first recorded in the look-up table and then the data groups 213 and 214 are recorded in the look-up table. In this embodiment, in step S115, the data groups 211~216 are arranged according to the original start-addresses of the data groups 211~216. As illustrated in FIG. 2C, the look-up table records the original start-addresses, the data lengths, and the new start-addresses of the data groups 211~216 in order.

Figure 3:
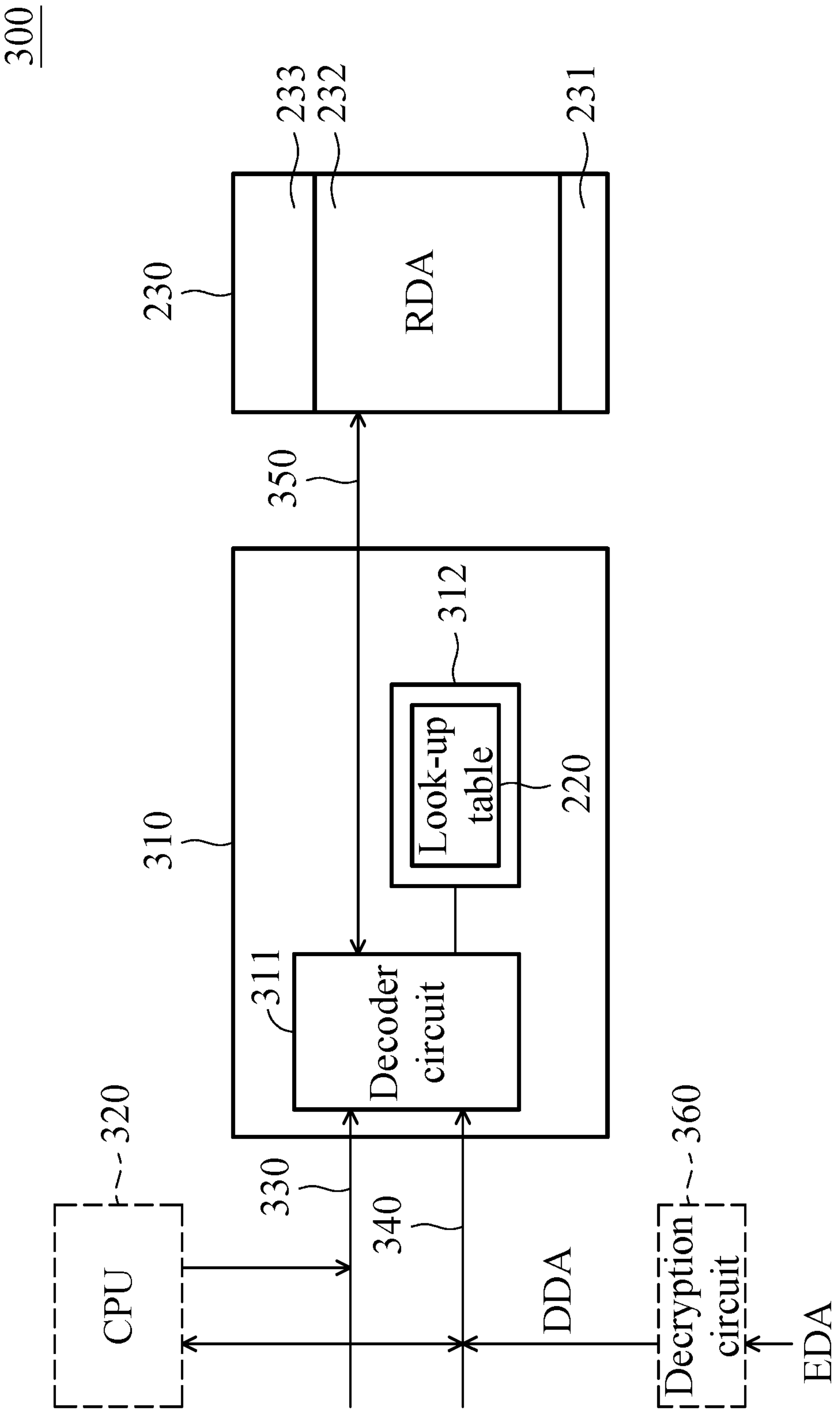
FIG. 3 is a schematic diagram of an exemplary embodiment of a micro-controller according to various aspects of the present disclosure.

FIG. 3 is a schematic diagram of an exemplary embodiment of a micro-controller according to various aspects of the present disclosure. The micro-controller 300 has a data protection function to avoid steal the program codes and data from the internal storage memory. In this embodiment, the micro-controller 300 comprises a storage memory 230 and a memory controller 310.

The storage memory 230 comprises the blocks 231~233. In this embodiment, the random data RDA is stored in the block 232. The memory controller 310 is configured to access the storage memory 230. In some embodiments, the memory controller 310 accesses the storage memory 230 via the memory bus 350. In this embodiment, the memory controller 310 comprises a decoder circuit 311 and a storage memory 312.

The storage memory 312 stores the look-up table 220. As shown in FIG. 2C, the look-up table 220 records the original addresses of the data groups 211~216, the data lengths of the data groups 211~216, and the new addresses (which can also be referred to as random addresses) of the data groups 211~216. The decoder circuit 311 is coupled to an instruction bus 330 and a data bus 340. The decoder circuit 311 decodes an access command provided by the instruction bus 330. In one embodiment, when the access command is a read command, the decoder circuit 311 decodes the read command to determine the read address. The decoder circuit 311 uses the read address as the original start-address and checks the look-up table 220 to find the new start-address and the data length which correspond to the original start-address. The decoder circuit 311 reads the storage memory 230 according to the new start-address and the data length to obtain a specific data group.

As illustrated in FIGS. 2C and 2D, assume that the read address is 0x1800. In this case, the decoder circuit 311 checks the look-up table 220 to find the new start-address 0x1814 corresponding to the read address 0x1800. Therefore, the decoder circuit 311 reads the data group (e.g., 211) corresponding to the address 0x1814 in the storage memory 230. In one embodiment, the decoder circuit 311 outputs the data group 211 to a central processing unit (CPU) 320 via the data bus 340. In other embodiments, the CPU 320 outputs a read command to the decoder circuit 311 via the instruction bus 330.

The source of providing the look-up table 220 is not limited in the present disclosure. In one embodiment, the look-up table 220 is provided by an external circuit (not shown) disposed outside of the micro-controller 300. The decoder circuit 311 receives the look-up table 220 via the data bus 340 and writes the look-up table 220 to the storage memory 312.

In another embodiment, to increase the security of the look-up table 220, an external circuit performs an encryption operation for the look-up table 220 to generate encrypted data EDA. In such cases, the micro-controller 300 further comprises a decryption circuit 360. The decryption circuit 360 performs a decryption operation for the encrypted data EDA to generate decrypted data (i.e., the look-up table 220) DDA. The decryption circuit 311 receives the decrypted data DDA via the data bus 340 and writes the decrypted data DDA into the storage memory 312.

In other embodiments, the decryption circuit 360 is integrated into the memory controller 310. In this case, the decryption circuit 360 receives the encrypted data EDA via the data bus 340 and provides the decrypted data DDA to the decoder circuit 311. In another embodiment, the decryption circuit 360 may utilize other input-output interface (not shown) to receive the encrypted data EDA. In some embodiments, the decryption circuit 360 may be combined into the decoder circuit 311. In this case, the decryption circuit 360 may utilize the data bus 340 or other input-output interface to receive the encrypted data EDA.

Figure 4:
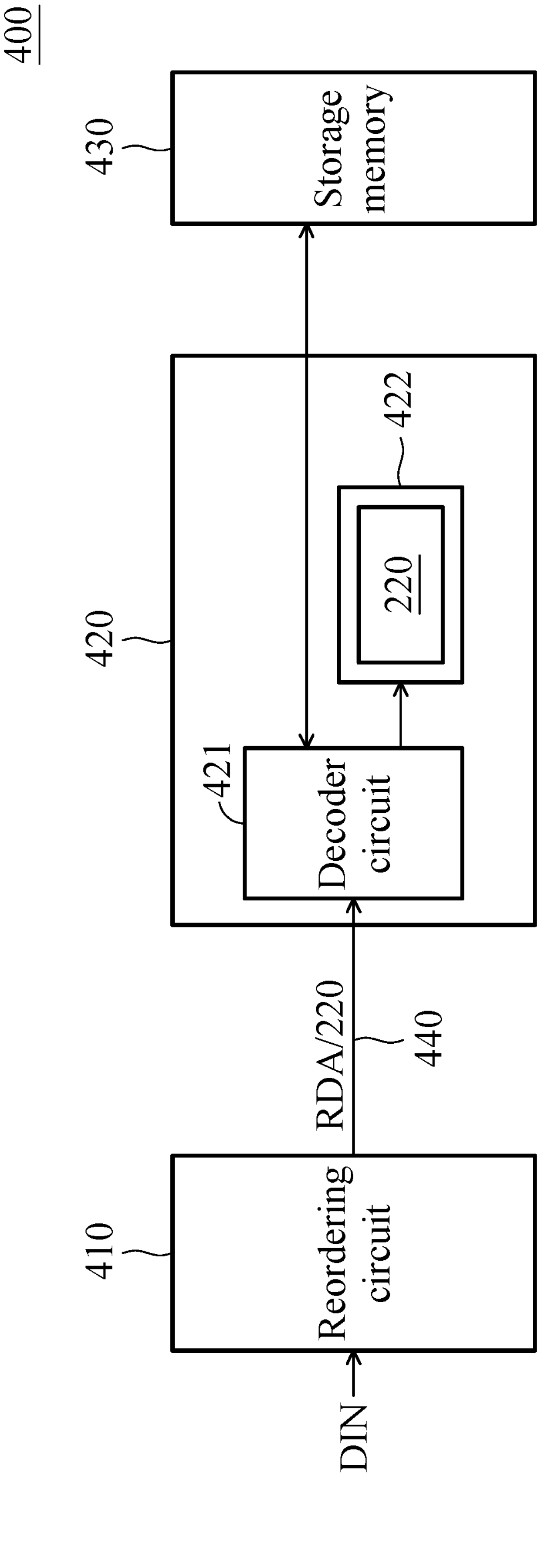
FIG. 4 is a schematic diagram of an exemplary embodiment of a data protection device according to various aspects of the present disclosure.

FIG. 4 is a schematic diagram of an exemplary embodiment of a data protection device according to various aspects of the present disclosure. The data protection device 400 comprises a reordering circuit 410, a memory controller 420, and a storage memory 430. The reordering circuit 410 splits the input data DIN into a plurality of data groups and records the original start-address of each data group and the data length of each data group. Taking FIG. 2A as an example, the reordering circuit 410 splits the input data DIN into the data groups 211~216. In this case, the reordering circuit 410 records the original start-addresses and the data lengths of the data groups 211~216.

The reordering circuit 410 randomly splits the data groups 211~216 to generate random data RDA and records the new start-address of each data group of the random data RDA. In this case, the reordering circuit 410 collects the original start-addresses, the data lengths, and the new start-addresses of the data groups 211~216 to provide the look-up table 220. As shown in FIG. 2C, the look-up table 220 records the original start-addresses and the new start-addresses of all data groups. Each original start-address corresponds to one new start-address.

The memory controller 420 stores the look-up table 220 and writes the random data RDA to the storage memory 430 according to the look-up table 220. In one embodiment, the memory controller 420 receives the random data RDA and the look-up table 220 via the data bus 440. In another embodiment, the memory controller 420 receives an access command (e.g., a write command or a read command) via an instruction bus. In this case, the data protection device 400 further comprises a CPU (not shown). In this case, the CPU may provide a read command or a write command to the memory controller 420 via the instruction bus.

When the memory controller 420 receives a write command, the memory controller 420 writes the random data RDA to the storage memory 430 according to the new start-addresses recorded in the look-up table 220. When the memory controller 420 receives a read command, the memory controller 420 decodes the read command to generate a read address. The memory controller 420 determines a corresponding new start-address corresponding to the read address according to the look-up table 220. The memory controller 420 reads a corresponding data group corresponding to the corresponding new start-address from the storage memory 430 and outputs the corresponding data group.

In this embodiment, the memory controller 420 comprises a decoder circuit 421 and a storage memory 422. In one embodiment, the memory controller 420 and the storage memory 430 are combined into a memory controller. In this case, the reordering circuit 410 is disposed outside of the memory controller. Since the characteristics of the decoder circuit 421 and the storage memory 422 are similar to the characteristics of the decoder circuit 311 and the storage memory 312 shown in FIG. 3, the related description is omitted here.

In some embodiments, the memory controller 420 further comprises a fast look-up engine (not shown). The fast look-up engine uses the look-up table 220 to search a new start-address corresponding to the read address. Additionally, since the characteristic of the storage memory 430 is similar to the characteristic of the storage memory 230 shown in FIG. 3, the related description is omitted here.

Figure 5:
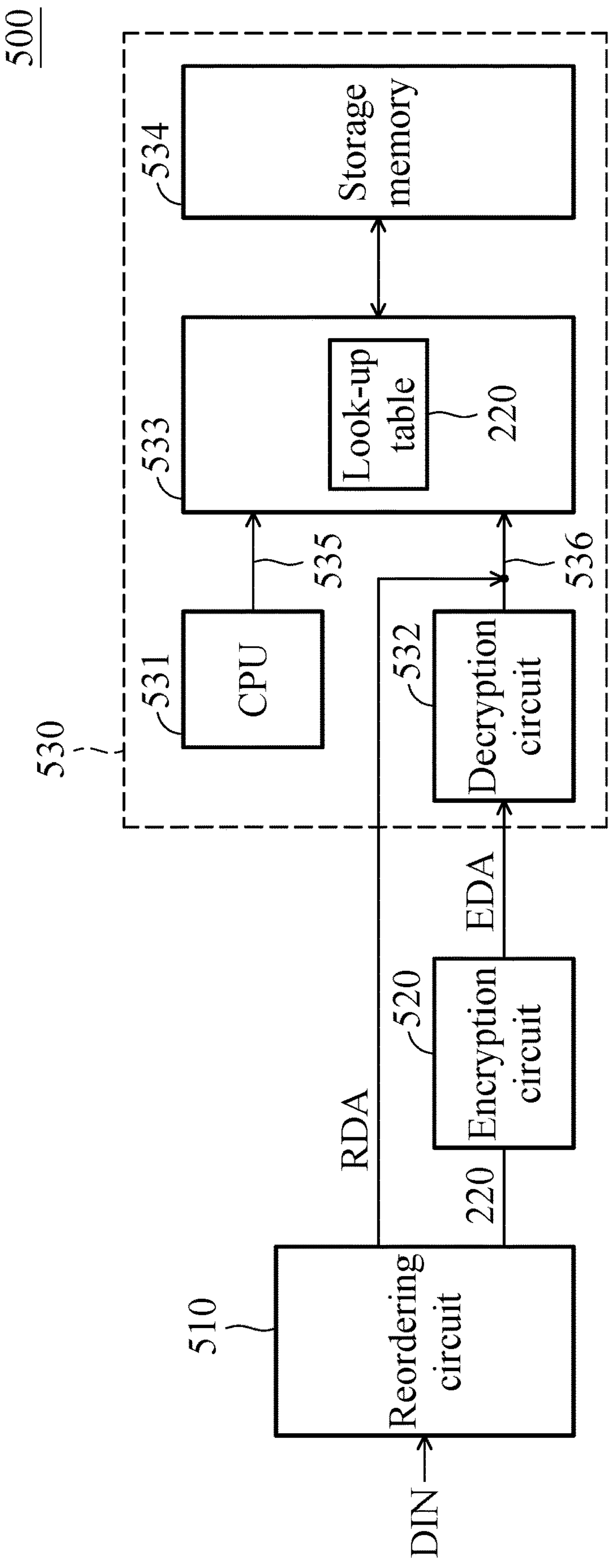
FIG. 5 is a schematic diagram of another exemplary embodiment of the data protection device according to various aspects of the present disclosure.

FIG. 5 is a schematic diagram of another exemplary embodiment of the data protection device according to various aspects of the present disclosure. The data protection device 500 comprises a reordering circuit 510, an encryption circuit 520 and a micro-controller 530. Since the characteristic of the reordering circuit 510 shown in FIG. 5 is similar to the characteristic of the reordering circuit 410 shown in FIG. 4, the related description is omitted here. The encryption circuit 520 encrypts the look-up table 220 to generate encrypted data EDA. In one embodiment, the encryption circuit 520 is disposed outside of the micro-controller 530. In other embodiments, the encryption circuit 520 and the reordering circuit 510 may be integrated into the micro-controller 530.

In this embodiment, the micro-controller 530 comprises a CPU 531, a decryption circuit 532, a memory controller 533, and a storage memory 534. The CPU 531 may utilize an instruction bus 535 to provide a read command or a write command to the memory controller 533. Since the characteristic of the CPU 531 is similar to the characteristic of the CPU 320 shown in FIG. 3, the related description is omitted here.

The decryption circuit 532 decrypts the encrypted data EDA to restore the look-up table 220 and stores the restored look-up table 220 to the memory controller 533. In one embodiment, the decryption circuit 532 is disposed in the micro-controller 530. Since the characteristic of the decryption circuit 532 is similar to the characteristic of the decryption circuit 360 shown in FIG. 3, the related description is omitted here.

The memory controller 533 receives an access command (e.g., a read command or a write command) via the instruction bus 535 and receives the random data RDA and the look-up table 220 via the data bus 536. Since the characteristic of the memory controller 533 similar to the characteristic of each of the memory controller 310 shown in FIG. 3 and the memory controller 420 shown in FIG. 4, the related description is omitted here. Additionally, since the characteristic of the storage memory 534 is similar to the characteristic of the storage memory 230 shown in FIG. 3, the related description is omitted here.

Since the storage memory 534 in the micro-controller 530 stores the data groups which are randomly arranged and the data length of one data group may be different from the data length of another data group, the security of data stored in the storage memory 534 can be increased. Furthermore, since the micro-controller 530 stores a look-up table, the data to be fetched by the CPU can be quickly restored to ensure the confidentiality of the data.

Data protection methods, or certain aspects or portions thereof, may take the form of a program code (i.e., executable instructions) embodied in tangible media, such as floppy diskettes, CD-ROMS, hard drives, or any other machine-readable storage medium, wherein, when the program code is loaded into and executed by a machine such as a computer, the machine thereby becomes a data protection device for practicing the methods. The methods may also be embodied in the form of a program code transmitted over some transmission medium, such as electrical wiring or cabling, through fiber optics, or via any other form of transmission, wherein, when the program code is received and loaded into and executed by a machine such as a computer, the machine becomes a data protection device for practicing the disclosed methods. When implemented on a general-purpose processor, the program code combines with the processor to provide a unique apparatus that operates analogously to application-specific logic circuits.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein. It will be understood that although the terms "first," "second," etc. may be used herein to describe various elements, these elements should not be limited by these terms. These terms are only used to distinguish one element from another.

While the invention has been described by way of example and in terms of the preferred embodiments, it should be understood that the invention is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A data protection method comprising:

storing input data in a first storage memory;

splitting the input data into a plurality of data groups;

recording an original start-address of each data group and a data length of each data group;

using a Binary-tree search method to reorder the sequence of the data groups, wherein the reordered data groups constitute random data;

storing the random data in the first storage memory to replace the input data;

recording a new start-address for each reordered data group;

collecting the original start-addresses, the data lengths, and the new start-addresses to form a look-up table, wherein the look-up table records the original start-addresses of the data groups and the new start-addresses of the reordered data groups, and each original start-address corresponds to one new start-address;

storing the random data into a second storage memory; and storing the look-up table into a memory controller.

2. The data protection method as claimed in claim 1, wherein the data length of a first data group of the data groups is different from the data length of a second data group of the data groups.

3. The data protection method as claimed in claim 2, wherein the data length of the first data group is the same as the data length of a third data group of the data groups.

4. The data protection method as claimed in claim 1, wherein the step of collecting the original start-addresses, the data lengths, and the new start-addresses to form a look-up table comprises:

arranging the reordered data groups according to the data lengths of the data groups.

5. The data protection method as claimed in claim 1, wherein the step of collecting the original start-addresses, the data lengths, and the new start-addresses to form a look-up table comprises:

utilizing the Binary-tree search method to arrange the reordered data groups.

6. The data protection method as claimed in claim 1, wherein the step of storing the look-up table into a memory controller comprises:

encrypting the look-up table to generate encrypted data;

decrypting the encrypted data to generate restored data; and storing the restored data in the memory controller, wherein the restored data is the unencrypted look-up table.

7. The data protection method as claimed in claim 1, further comprising:
receiving a read command;
decoding the read command to generate a read address;
utilizing the look-up table to find a new start-address corresponding to the read address;
reading the second storage memory to determine a data group corresponding to the new start-address; and
outputting the corresponding data group.

8. A data protection device comprising:
a reordering circuit splitting input data stored in a first storage memory into a plurality of data groups and recording an original start-address of each data group and a data length of each data group, wherein the reordering circuit uses a Binary-tree search method to reorder the sequence of the data groups, the reordered data groups constitute random data, the random data is stored in the first storage memory to replace the input data, the reordering circuit records a new start-address of each reordered data group, and collects the original start-addresses, the data lengths and the new start-addresses to generate a look-up table, the look-up table records the original start-addresses of the data groups and the new start-addresses of the reordered data groups, and each original start-address corresponds to one new start-address;
a second storage memory storing the random data; and
a memory controller storing the look-up table.

9. The data protection device as claimed in claim 8, wherein the storage memory, the reordering circuit and the memory controller are integrated into a micro-controller unit (MCU).

10. The data protection device as claimed in claim 9, further comprising:
an encryption circuit encrypting the look-up table to generate encrypted data;
a decryption circuit decrypting the encrypted data to restore the look-up table and storing the restored look-up table in the memory controller,
wherein the restored data is the unencrypted look-up table,
wherein the encryption circuit and the decryption circuit are disposed inside of the micro-controller unit.

11. The data protection device as claimed in claim 10, wherein the reordering circuit uses the Binary-tree search method to reorder the sequence of the data groups and serves the reordered result as the look-up table.

12. The data protection device as claimed in claim 8, wherein in response to the memory controller receiving a write command, the memory controller writes the random data to the second storage memory according to the new start-addresses recorded in the look-up table.

13. The data protection device as claimed in claim 12, wherein:
in response to the memory controller receiving a read command, the memory controller decodes the read command to generate a read address and checks the look-up table to find a corresponding new start-address corresponding to the read address,
the memory controller reads the second storage memory to determine a data group corresponding to the corresponding new start-address and outputs the data group.

14. The data protection device as claimed in claim 13, wherein the memory controller comprises:
a fast look-up engine searching the look-up table to determine the corresponding new start-address corresponding to the read address.

15. The data protection device as claimed in claim 14, further comprising:
a central processing unit (CPU) sending the write command and the read command;
an instruction bus coupled between the CPU and the memory controller to transmit the write command and the read command; and
a data bus coupled between the CPU and the memory controller to transmit the corresponding data groups.

16. The data protection device as claimed in claim 8, wherein the data length of a first data group of the data groups is different from the data length of a second data group of the data groups.

17. The data protection device as claimed in claim 16, wherein the data length of the first data group is the same as the data length of a third data group of the data groups.

18. The data protection device as claimed in claim 8, wherein the start-address of the random data stored in the second storage memory is the same as the start-address of the random data stored in the first storage memory.

* * * * *